Nov. 7, 1939.  F. TRAVNICEK  2,178,657
SPEED REDUCING MECHANISM
Filed May 21, 1937
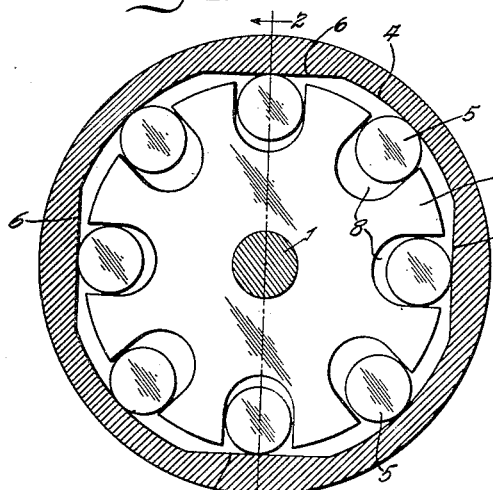
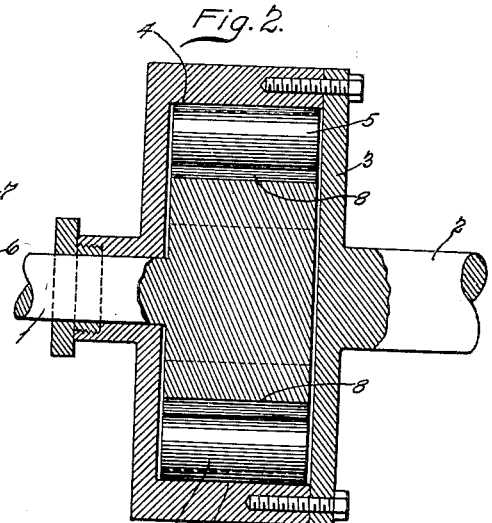
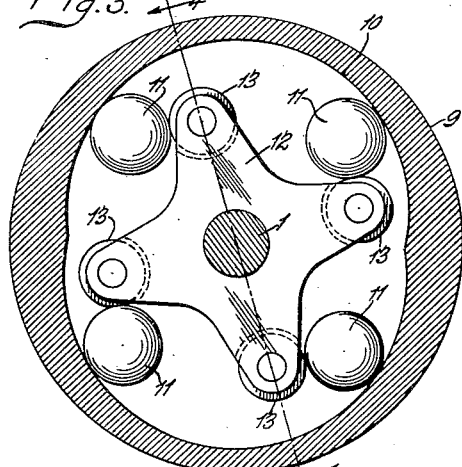
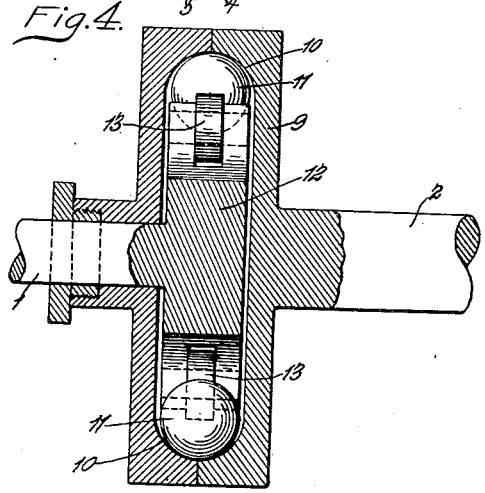
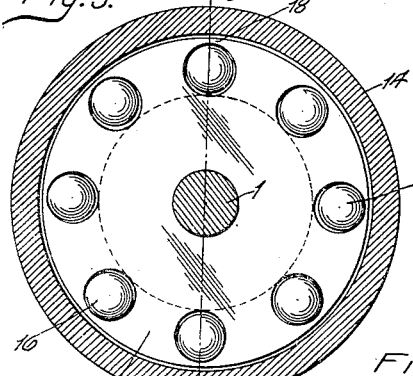
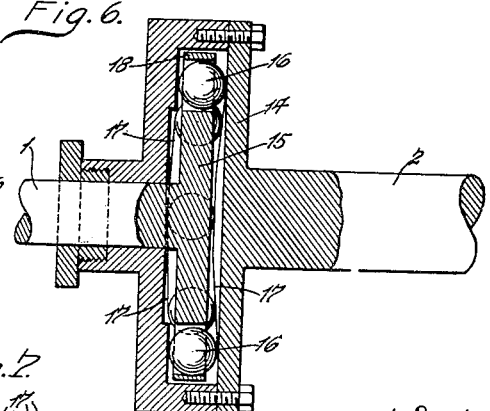
Inventor
Frank Travnicek
by Ripley & Cassidy
His Attorneys Patented Nov. 7, 1939

2,178,657

UNITED STATES PATENT OFFICE 2,178,657

SPEED REDUCING MECHANISM

Frank Travnicek, East St. Louis, Ill.

Application May 21, 1937, Serial No. 143,965

4 Claims. (Cl. 74—64)

This invention relates to speed reducing mechanism.

An object of the invention is to provide novel mechanism for efficiently transmitting power and reducing speed from a relatively high speed to a low one. The device may be used in any relationships in which a shaft driven by a prime mover is caused to rotate at a high rate, where the prime mover is a turbine, electric motor or the like.

Figs. 1 and 2 illustrate one embodiment of the invention; Fig. 1 being a vertical section through the device, and Fig. 2 being a cross section approximately on line 2—2, Fig. 1.

Figs. 3 and 4 illustrate another embodiment of the invention; Fig. 3 being a vertical section, and Fig. 4 being a cross section on line 4—4, Fig. 3.

Figs. 5 and 6 illustrate a further embodiment of the invention; Fig. 5 being a cross section, and Fig. 6 being a section approximately on line 6—6, Fig. 5.

Fig. 7 is a diagram showing the path of driven floating members in the embodiment shown in Figs. 5 and 6.

In accordance with this invention a power shaft 1, driven by a prime mover at a high rate of speed is in axial alignment with a shaft 2 to be driven at a lower rate of speed. As shown in Figs. 1 and 2, a housing 3 is secured to the driven shaft 2 and provides a race 4 about the axis of the shafts for a plurality of rollers or floating members 5. The race 4 is non-circular in form, differing from a circle with the axis as a center by having a plurality of parts or portions 6 which depart gradually from the circle. The power shaft 1 projects through the wall of the housing as clearly shown in Fig. 2 and has secured to it a propeller 7. The propeller has recesses 8 to accommodate the rollers 5, whereby the rollers are positively driven.

When the shaft 1 starts rotating the shaft 2 will be stationary. As it rotates it propels the rollers 5 about the axis and centrifugal force will cause them to follow the surface of the race 4. As a roller reaches the surface 6 its inertia will tend to rotate the housing 3 and with it the shaft 2, but at a speed much below that of the power shaft.

The embodiment shown in Figs. 3 and 4 is similar in function to that shown in Figs. 1 and 2, but with certain differences in structure. The driven shaft 2 carries a housing 9 which has in its inner periphery a race 10 to accommodate balls 11. The power shaft 1, as in the preceding embodiment, projects through a wall of the housing and carries a propeller 12. A plurality of rollers 13 are journalled in the propeller and are adapted to engage and propel the balls 11 in rotation about the axis of the shafts along the race 10. The race 10 is in the form of a series of curves which depart gradually from a circle having the axis of the shafts as a center. Power is transmitted in this embodiment as in the preceding embodiment by the inertia of the fast moving balls 11 striking the surfaces of the race inclined inwardly toward the axis.

In the embodiment shown in Figs. 1 and 3, the surface of the race (4 in Figs. 1 and 2, and 10 in Figs. 3 and 4) departs gradually from a circle having the axis of the shaft 1 as a center and never departs widely from such a circle; so that the floating members will not wedge between the propeller and the race to couple the propeller and the race, but the floating members 5 or 11 will freely run in the race and a positive or fixed connection between the propeller and the race, or between the shafts, will not occur. The propeller will cause the floating members to freely run in the race whereby the inertia of those members will impart a force to rotate the race at a speed less than that of the propeller.

In the embodiment shown in Figs. 5 and 6, the driven shaft 2 carries a housing 14, the power shaft 1 passing through a wall of the housing and carrying a propeller 15. In this embodiment the raceway is formed on the vertical faces of the housing walls and the path of floating members 16 lies within the surface of a cylinder having as its axis the axis of the shafts. But the path departs sidewise from a circle by inclined portions 17. Thus the members 16 follow a path which is shown diagrammatically in Fig. 7. That is to say the balls or floating members 16 move axially out of a true circle but are always equidistant from the axis of the shafts. However, the inertia of the balls and their changing direction causes the driving effect between the relative moving parts. The balls 16 are held in position by a cage 18 so arranged as to restrain movement radially but permitting axial variation and allowing them to follow the path provided by the race 17.

Various changes may be made in the details of construction, within the scope of the appended claims, without departing from the spirit of this invention.

I claim:

1. A speed reducing mechanism including a power shaft, a driven shaft in alignment with the power shaft, a race secured to the driven shaft about the axis of the shafts providing an endless path lying within a cylindrical surface having the axis of the shafts as an axis with one or more sections departing slightly from a circle, a propeller secured to the power shaft and having a cage, one or more balls so supported by the cage as to be rotated in the race and permitted sufficient sidewise movement to accommodate themselves to the race.

2. A speed reducing mechanism including a power shaft, a driven shaft in alignment with the power shaft, a carrier on the power shaft, followers supported by said carrier for rotation with the shaft, a cam secured to the driven shaft and providing a continuous path for the followers about the axis of the shafts equidistant therefrom but having one or more sections departing in a lateral direction slightly from a circle whereby the driving effect between the followers and the cam is produced substantially alone by the momentum of the followers.

3. A speed reducing mechanism including a power shaft, a carrier secured to the power shaft, a housing for the carrier and through which the power shaft extends, a race in the housing providing a continuous path about the shaft equidistant from the axis of the shaft but having one or more sections departing in a lateral direction slightly from a circle, balls so supported by the carrier as to be rotated in the race and permitted sufficient sidewise movement to accommodate themselves to the race, and a driven shaft secured to the housing.

4. A speed reducing mechanism including a power shaft, a housing through which the shaft extends and having a continuous cam about the shaft equidistant from the axis thereof but having one or more sections departing in a lateral direction slightly from a circle, a carrier on the shaft followers supported by the carrier for rotation with the shaft and permitted sufficient sidewise movement to accommodate themselves to the race, and a driven shaft secured to the housing in alignment with the power shaft.

FRANK TRAVNICEK.